(12) United States Patent
Westfechtel et al.

(10) Patent No.: US 8,148,305 B2
(45) Date of Patent: Apr. 3, 2012

(54) OLIGOGLYERCOL FATTY ACID ESTER ADDITIVES FOR WATER-BASED DRILLING FLUIDS

(75) Inventors: Alfred Westfechtel, Hilden (DE); Diana Maker, Monheim (DE); Heinz Muller, Monheim (DE)

(73) Assignee: Emery Oleochemicals GmbH, Dusseldorf (DE)

( * ) Notice: Subject to any disclaimer, the term of this patent is extended or adjusted under 35 U.S.C. 154(b) by 53 days.

(21) Appl. No.: 12/677,874

(22) PCT Filed: Sep. 12, 2008

(86) PCT No.: PCT/EP2008/062200
§ 371 (c)(1),
(2), (4) Date: Jun. 4, 2010

(87) PCT Pub. No.: WO2009/037212
PCT Pub. Date: Mar. 26, 2009

(65) Prior Publication Data
US 2010/0305009 A1     Dec. 2, 2010

(30) Foreign Application Priority Data
Sep. 14, 2007  (EP) ..................... 07018086

(51) Int. Cl.
C09K 8/04 (2006.01)
C09K 8/12 (2006.01)

(52) U.S. Cl. .......... 507/138; 507/136; 507/904; 516/53; 516/72; 516/73; 554/227

(58) Field of Classification Search .................. 507/138, 507/136, 904; 516/53, 72, 73; 554/227
See application file for complete search history.

(56) References Cited

U.S. PATENT DOCUMENTS

| | | |
|---|---|---|
| 4,614,604 A | 9/1986 | Helfert et al. |
| 4,802,998 A | 2/1989 | Mueller et al. |
| 5,232,910 A | 8/1993 | Mueller et al. |
| 5,252,554 A | 10/1993 | Mueller et al. |
| 5,254,531 A | 10/1993 | Mueller et al. |
| 5,318,954 A | 6/1994 | Mueller et al. |
| 5,318,956 A | 6/1994 | Mueller et al. |
| 5,348,938 A | 9/1994 | Mueller et al. |
| 5,403,822 A | 4/1995 | Mueller et al. |
| 5,424,469 A | 6/1995 | Jakobson et al. |
| 5,441,927 A | 8/1995 | Mueller et al. |
| 5,461,028 A | 10/1995 | Mueller et al. |
| 5,466,719 A | 11/1995 | Jakobson et al. |
| 5,663,122 A | 9/1997 | Mueller et al. |
| 5,755,892 A | 5/1998 | Herold et al. |
| 5,846,601 A | 12/1998 | Ritter et al. |
| RE36,066 E | 1/1999 | Mueller et al. |
| 5,869,434 A | 2/1999 | Mueller et al. |
| 6,022,833 A | 2/2000 | Mueller et al. |
| 6,122,860 A | 9/2000 | Von Tapavicza et al. |
| 6,165,946 A | 12/2000 | Mueller et al. |
| 6,289,989 B1 | 9/2001 | Mueller et al. |
| 6,350,788 B1 | 2/2002 | Herold et al. |
| 6,716,799 B1 | 4/2004 | Mueller et al. |
| 6,806,235 B1 | 10/2004 | Mueller et al. |
| 7,041,738 B2 | 5/2006 | Krull et al. |
| 7,666,820 B2 | 2/2010 | Mueller et al. |
| 2003/0114316 A1 | 6/2003 | Patel et al. |
| 2004/0006912 A1 | 1/2004 | Krull |
| 2004/0010965 A1 | 1/2004 | Krull |
| 2006/0162241 A1 | 7/2006 | Krull |
| 2007/0049500 A1 | 3/2007 | Mueller et al. |
| 2007/0219097 A1 | 9/2007 | Mueller et al. |
| 2007/0219098 A1 | 9/2007 | Mueller et al. |
| 2008/0110083 A1 | 5/2008 | Baehr et al. |
| 2008/0234145 A1 | 9/2008 | Mueller et al. |
| 2008/0262252 A1 | 10/2008 | Krull |
| 2010/0048931 A1 | 2/2010 | Westfechtel et al. |
| 2010/0256021 A1* | 10/2010 | Muller et al. .................. 507/138 |
| 2010/0298176 A1* | 11/2010 | Maker et al. .................. 507/138 |

FOREIGN PATENT DOCUMENTS

| | | |
|---|---|---|
| DE | 3622826 A1 | 1/1988 |
| DE | 4226174 A1 | 2/1994 |
| DE | 19647598 A1 | 5/1998 |
| DE | 19852971 A1 | 5/2000 |
| DE | 10252973 A1 | 5/2004 |
| DE | 102005060549 A1 | 6/2007 |
| EP | 0064697 A1 | 11/1982 |
| EP | 0374671 A1 | 6/1990 |
| EP | 0374672 A1 | 6/1990 |
| EP | 0579159 A2 | 1/1994 |
| EP | 0770661 A1 | 5/1997 |
| EP | 0787706 A1 | 8/1997 |
| WO | 2007068404 A1 | 6/2007 |

OTHER PUBLICATIONS

International Search Report mailed on Nov. 6, 2008 in PCT/EP2008/062200. Klein et al., U.S. Appl. No. 12/602,913, filed Mar. 2, 2010.
Maker et al., U.S. Appl. No. 12/677,845, filed Mar. 12, 2010.
Muller et al., U.S. Appl. No. 12/677,896, filed Mar. 12, 2010.
Westfechtel et al., U.S. Appl. No. 12/602,945, filed Mar. 2, 2010.

\* cited by examiner

*Primary Examiner* — Timothy J. Kugel
(74) *Attorney, Agent, or Firm* — Smith Moore Leatherwood LLP; Philip P. McCann

(57) ABSTRACT

The use of oligoglycerol fatty acid esters, prepared from
(a) an acid component chosen from
  (a1) fatty acids of the general formula (I)

R—COOH     (I)

in which R represents a saturated or unsaturated, branched or linear alkyl or alkenyl radical having 7 to 21 C atoms, and/or
  (a2) dicarboxylic acids and/or
  (a3) dimer fatty acids and/or
  (a4) oligomer fatty acids and/or
  (a5) hydroxy fatty acids with
(b) a polyol component which is chosen from oligoglycerols or alkoxylates of oligoglycerols, as an additive in water-based drilling mud compositions for improving the lubricating action of these mud systems, is described.

12 Claims, 5 Drawing Sheets

OLIGOGLYERCOL FATTY ACID ESTER ADDITIVES FOR WATER-BASED DRILLING FLUIDS

This application is a national stage application under 35 U.S.C. 371 of international application No. PCT/EP2008/062200 filed 12 Sep. 2008, and claims priority to European Application No. EP 07018086.4 filed 14 Sep. 2007, the disclosures of which are expressly incorporated herein by reference.

BACKGROUND

The present invention relates to the use of certain esters as an additive in water-based drilling mud compositions, and to water-based drilling mud compositions containing these additives. In this context, the additives according to the invention serve in particular to improve the lubricating action of drilling muds Liquid mud systems for sinking rock boreholes while bringing up the detached cuttings, generally called drilling muds in the following, are optionally thickened flowable systems based on water or on oil. In historical development, the class of purely water-based mud systems extends the furthest back into the past. However, their use is associated with deficiencies, the lubricating action of the mud being too low being emphasized as a disadvantage. Working with purely water-based systems therefore necessitates the co-use of components with a lubricant action. A large number of additives are known as lubricants for use in practice. These include e.g. mineral oils or animal and plant oils, that is to say triglycerides of fatty acids and carboxylic acid esters of monoalcohols. Sulphonates of plant oils, in particular soya oil sulphonate, are furthermore employed in practice as lubricants. Soya oil sulphonate can be employed in water- and oil-based systems, but shows significant foaming, especially in water-based muds, which limits the use properties.

The increasingly stricter regulations with respect to the biodegradability of drilling mud systems and the constituents thereof allow the use of the otherwise particularly suitable mineral oils less and less. At the same time, interest is growing in alternatives which have a better biodegradability, in particular the esters. EP 0 770 661 describes esters of monocarboxylic acids with monohydric alcohols as suitable lubricants for water-based drilling mud systems. A 2-ethylhexyl oleate is disclosed concretely as a suitable lubricant for silicate-containing aqueous muds. DE 196 47 598 describes $C_{12-30}$ fatty alcohols and mixture thereof with fatty acid esters as suitable lubricants for purely water-based silicate-containing drilling muds. Triglycerides of fatty acids are also mentioned as esters. It is known that for the purpose of ground exploration, carboxylic acid esters in particular have a particularly pronounced lubricant action which is utilized in many ways. However, their use in water-based systems and especially in comparatively highly alkaline water-glass systems can lead to considerable difficulties. In fact, components with a marked tendency towards foaming can form as secondary products by ester cleavage, and then introduce undesirable problems into the flushing system.

DE 10 2005 060 549 A1 describes an additive containing ether carboxylic acids in a mixture with fatty acid triglycerides as a lubricant additive for water-based drilling mud compositions.

SUMMARY

The present invention includes various embodiments as set forth herein.

It has now been found that by using certain esters, an improvement in the lubricating action of water-based drilling muds can likewise be effected.

The invention provides the use of oligoglycerol fatty acid esters prepared from (a) an acid component chosen from (a1) fatty acids of the general formula (I) R—COOH (I), in which R represents a saturated or unsaturated, branched or linear alkyl or alkenyl radical having 7 to 21 C atoms, and/or (a2) dicarboxylic acids and/or (a3) dimer fatty acids and/or (a4) oligomer fatty acids and/or (a5) hydroxy fatty acids with (b) a polyol component which is chosen from oligoglycerols or alkoxylates of oligoglycerols, as an additive in water-based drilling mud compositions, preferably for improving the lubricity of the muds.

FIGURES

The foregoing and other features, aspects, and advantages of the present invention will become better understood with regard to the following description, appended claims, and accompanying drawings where:

DETAILED DESCRIPTION

Figure 1:
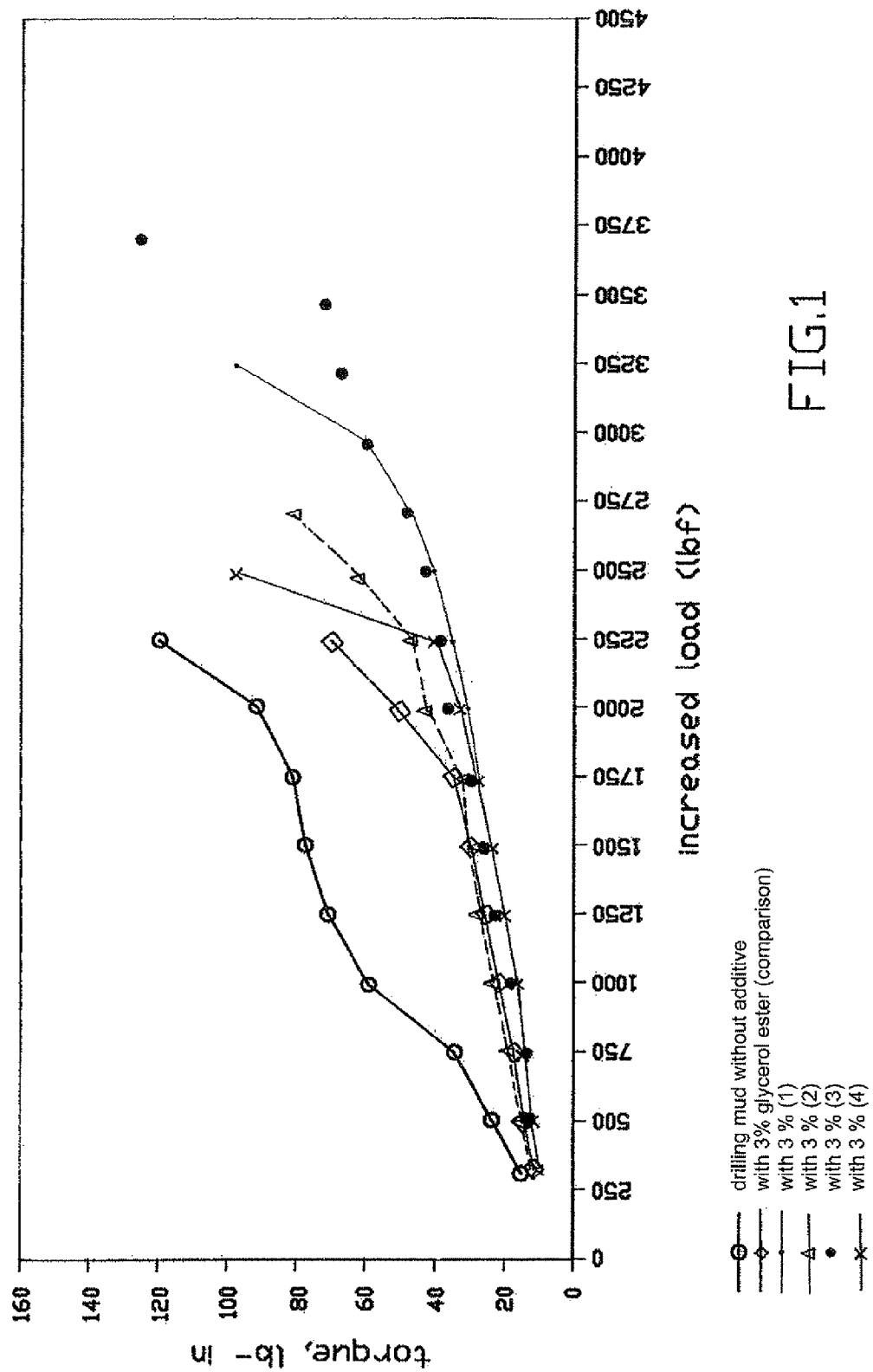
FIG. 1 is a graph showing a comparison of torque and increased load.

The oligoglycerol esters according to the invention are compounds which are known per se and can be obtained e.g. by acid- or base-catalyzed esterification directly from oligoglycerol with the fatty acids. The oligoglycerol esters are also called oligoglycerol fatty acid esters or oligoglycerides. EP 064 697 A1 describes various oligoglycerol esters as lubricants for PVC. The preparation of the oligoglycerol esters by means of basic catalysis from fatty acids and poly- or oligoglycerols is also described in this specification. The oligoglycerol esters (or "oligoglycerides" for short) in the context of the invention are as a rule compounds which are liquid at room temperature and are made up of a mixture of various oligoglycerol esters, it being possible for them also to contain starting substances, in particular glycerol. Technical-grade oligoglycerols which can be used for the preparation of the oligoglycerol esters according to the invention typically contain mixtures of di- and triglycerol and tetra- and pentaglycerols and glycerol. Depending on the quality of the oligoglycerols, these can contain between 20 and 45 wt. % of glycerol, between 20 and 40 wt. % of diglycerol, between 10 and 20 wt. % of triglycerol and between 1 to 10 wt. % of tetraglycerol as well as between 0.5 to 5 wt. % of pentaglycerol.

It is already known from DE 102 52 973 A1 to employ oligoglycerol fatty acid esters together with a selected alkylphenol resin to improve the lubricity of fuel oils. US 2003/0114316 A1 discloses invert drilling mud systems, that is to say compositions which contain an aqueous and oily phase in a form side by side in emulsified form, and indeed exclusively as a water-in-oil emulsion, wherein the oily phase is continuous and the aqueous phase is the discontinuous phase, where these invert systems must contain either fatty acid esters of di- or triglycerol or esters of polyglycerols, in each case with fatty acids of the $C_{10}$-$C_{20}$ fraction, as emulsifiers. The esters of this specification are necessarily diesters of these $C_{10}$-$C_{20}$ fatty acids with di- or triglycerol or polyglycerols, only polyglycerol-2 diisostearate and polyglycerol-3 diisostearate being disclosed by name. According to the teaching of US 2003/0114316, these esters serve as emulsifiers for the preparation of the desired invert emulsion.

Possible acid components (a) of the esters according to the invention are, in particular, the fatty acids of type (a1) which follow the formula (I). There may be mentioned here as preferred caproic acid, caprylic acid, 2-ethylhexanoic acid, capric acid, lauric acid, isotridecanoic acid, myristic acid, palmitic acid, palmoleic acid, stearic acid, isostearic acid, oleic acid, elaidic acid, petroselic acid, linoleic acid, linolenic acid, elaeostearic acid, arachic acid, gadoleic acid, behenic acid and erucic acid and mixtures thereof, which e.g. due to technical circumstances are obtained during high pressure cracking of natural fats and oils or during reduction of aldehydes from the Roelen oxo synthesis.

Technical-grade fatty acids having 12 to 18 carbon atoms, such as, for example, coconut, palm, palm kernel or tallow fatty acids, are preferred.

Oligoglycerol esters wherein the fatty acid component (a1) is chosen from mono- or polyunsaturated, preferably linear fatty acids and preferably the linear unsaturated monocarboxylic acids are particularly preferred, oleic acid, also in technical-grade qualities, being particularly preferred.

Oligoglycerol esters of which component (a1) is chosen from tall oil fatty acids are likewise preferred. Tall oil fatty acids contain, in particular, mixtures of linoleic acid and conjugated $C_{18}$ fatty acids (45-65 wt. %), oleic acid (25-45 wt. %), octadeca-5,9,12-trienoic acid (5-12 wt. %) and saturated fatty acids (1-3 wt. %). In addition to the monocarboxylic acids of the type (a1), dicarboxylic acids (a2) and/or dimer fatty acids or oligomeric fatty acids of type (a3) or (a4) respectively are also suitable.

The dicarboxylic acids (a2) likewise represent suitable acid components. These are those carboxylic acids which contain two —COOH functions in the molecule, the saturated dicarboxylic acids being preferred in particular. The dicarboxylic acids (a2) preferably contain between 4 and 22 C atoms, in particular between 6 and 18 C atoms. There may be mentioned by way of example oxalic, malonic, succinic, glutaric, adipic, pimelic, suberic, azelaic and sebacic acid. Unsaturated dicarboxylic acids are also possible, e.g. fumaric or maleic acid. The dicarboxylic acids of group (a2) do not include the dimer fatty acids according to group (a3).

Dimer fatty acids (a3) are oxidation-stabilized dicarboxylic acids which are liquid at room temperature (21° C.) and are obtained e.g. by catalytic dimerization of unsaturated fatty acids, e.g. oleic acid, ricinene fatty acid or tall oil fatty acid, with exclusion of oxygen. The linking gives linear, monocyclic or aromatic structures, depending on the fatty acid used. The reaction proceeds with isomerization of isolated double bonds, predominantly by an addition of the Diels-Alder type. Commercially obtainable dimerized fatty acids are worked up by distillation and are made up of a mixture which e.g. in addition to low contents of linear and branched $C_{18}$-monocarboxylic acids (monomer fatty acid) predominantly contains $C_{36}$-dicarboxylic acids and varying contents, depending on the outlay on the working up, of $C_{54}$-tricarboxylic acid (trimer fatty acid), in addition to traces of higher polymer fatty acids. Both highly pure dimeric fatty acids with a dicarboxylic acid content of >97 wt. % and hydrogenated types which are completely free from yellowing are produced industrially.

Oligomeric fatty acids (a4) are reaction products of unsaturated fatty acids with one another, it being necessary for more than 2 and not more than 5 fatty acid molecules to react with one another. These acid components are likewise a mixture of various oligomers with one another.

Mixtures of oligoglycerol esters which have been prepared in the presence of various fatty acid sources or have been obtained by mixing are preferred as the polyol component for the esterification. Oligoglycerol esters which are also preferred are, inter alia, those which have been prepared by reaction of oligoglycerols of the formula (II) with fatty acid mixtures, preferably mixtures of saturated and unsaturated fatty acids (type (a1)) and/or dicarboxylic acids (a2) and/or dimeric and/or oligomeric fatty acids (type (a3) and (a4)).

Hydroxy fatty acids can furthermore be used as component (a5), ricinoleic and particularly preferably hydroxystearic acid e.g. being representatives of this class of fatty acids.

The components (b), that is to say the oligoglycerols in the context of the present teaching, contain between 2 and 10 glycerol monomers in the molecule, mixtures of various oligomers being present side by side, depending on the preparation process (e.g. the reaction temperature or time or the catalysts used). Molecules having more than 10 glycerol monomers are called polyglycerols.

The polyol component (b) of the esters according to the invention, that is to say the oligoglycerols, can preferably be described with the following general formula (II):

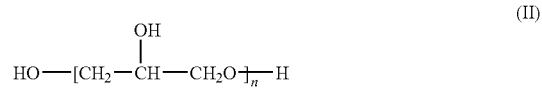

(II)

wherein n denotes a number between 2 and 10. Those oligoglycerols which contain between 4 and 10 glycerol monomers can preferably be employed as polyol component (b). The esters then preferably follow the general formula (III)

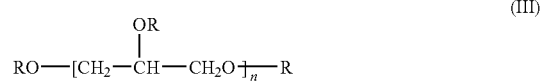

(III)

in which n represents numbers between 2 and 10 and R represents either a hydrogen atom or a radical CO—R', wherein R' then represents a saturated or unsaturated alkyl or alkenyl radical having 7 to 21 C atoms, wherein at least one OH function of the oligoglycerol must be esterified. However, it is preferable to use those oligoglycerols which contain between 4 and 10 glycerol monomers per molecule of oligoglycerol. In the formulae (II) and (III), this means an index of between 4 and 10.

The formula (III) shown above reproduces oligoglycerol esters with the acid component (a1). If hydroxy fatty acids (a5) are employed for the esterification, the radicals R can of course also contain alkyl or alkenyl radicals which have one or more free hydroxyl functions.

In addition to the oligoglycerols, alkoxylates thereof, that is to say reaction products of oligoglycerols with ethylene oxide and/or oligomers of alkoxylated glycerol with ethylene oxide and/or propylene oxide can also be employed as the alcohol component for the esters according to the invention. The ethoxylated oligoglycerols are preferred here.

It is preferable for the molar ratio of fatty acids:oligoglycerol in the esterification to be in the range of from 5:1 to 1:1, preferably 4:1 to 1:1 and in particular in the range of from 4:1 to 1.5:1. However, if dimer fatty acids (a2) or the oligomeric fatty acids (a3) are employed as the fatty acid component, the range of fatty acid to oligoglycerol of from 1:1 to 1:2 is particularly preferred.

Furthermore, in a preferred embodiment, for the preparation of the oligoglycerol fatty acid esters the molar ratio of the number of carboxyl groups of the acid component to the number of hydroxyl groups of the polyol component in the esterification is in a range of from 5:1 to 1:1, preferably 4:1 to 1:1 and in particular in the range of from 4:1 to 1.5:1. If dimer fatty acids (a2) or the oligomeric fatty acid (a3) are chosen as the acid component, a molar ratio of the number of carboxyl groups of the acid component to the number of hydroxyl groups of the polyol component in a range of from 1:1 to 1:2 is particularly preferred. If mixtures of several acid components are employed, the number of carboxyl groups is the sum of the carboxyl groups of all the acid components. If mixtures of several polyol components are employed, the number of hydroxyl groups is the sum of the hydroxyl groups of all the polyol components.

Full esters or mixtures of the various partial esters, optionally in a mixture with full esters, can be present side by side, depending on the reaction conditions of the esterification. The oligoglycerol esters in the context of the present technical teaching are predominantly partial esters, oligoglycerol triesters and/or tetra- and/or pentaesters being preferred.

The oligoglycerol esters of the invention are employed as an additive, in particular for lubrication, in water-based muds. The action of the oligoglycerol esters according to the invention as lubricants is preferred here. In this context, a use as a lubricant, in particular for lubrication, is defined as meaning that the friction of the mud, e.g. with the drilling rod and/or the formation, is reduced measurably by addition of the agent.

The invention therefore also provides the use of the oligoglycerol fatty acid esters according to the invention as lubricants for water-based drilling mud compositions, preferably for lubrication, preferably for water-based drilling mud compositions which contain at least 70 wt. % and preferably at least 80 wt. % and very particularly at least 90 wt. % of water—based on the phase which is liquid at room temperature (21° C.). The use in those emulsion drilling muds of which the external phase is formed from water is also preferred.

In this context, water-based drilling muds (WBM) are understood in the following as meaning those systems which preferably contain water to the extent of more than 60 wt. %—based on the phase of the composition which is liquid at room temperature (21° C.)—preferably contain as the liquid phase water to the extent of more than 70 wt. % and in particular to the extent of more than 80 wt. % and particularly preferably more than 90 wt. %. Purely water-based muds (100 wt. % of the liquid phase is water) may furthermore be particularly preferred. Suitable water is, in addition to fresh water, also synthetic or natural sea-water.

The present teaching also includes explicitly, as already stated above, those water-based muds which form emulsions, although only those of the oil-in-water (O/W) type—that is to say water forms the external phase in these systems according to the invention.

Emulsions in the context of the present teaching preferably also contain only minor amounts of an oily phase, for example less than 20 wt. %, preferably less than 10 wt. % or in particular less than 5 wt. %, based on the total liquid phase. Such oily phases in the water-based muds in the context of the present invention are formed, for example, by oils which are not water-soluble and are required for dissolving or dispersing additives.

Water-based drilling muds contain, in addition to the water as a carrier liquid, as a rule at least another agent for generating an increased viscosity, it being possible to use both mineral and organic compounds for this. The mineral viscosity-forming agents employed in the context of aqueous drilling muds to control the rheology are swellable clays of natural and/or synthetic origin. Examples which may be mentioned are appropriate smectites, such as montmorillonite, bentonite, beidellite, hectorite, saponite and stevensite. Attapulgite is a further important water-swellable auxiliary substance of the type in question here. A number of proposals are concerned with the synthetic preparation of finely divided clay-like minerals, in particular corresponding compounds of the hectorite and/or saponite type. Organic compounds, preferably polymers, are also suitable. There may be mentioned here e.g. xanthan gum or various cellulose derivatives. Bentonite is preferred in particular.

The oligoglycerol esters according to the above description can be used either by themselves or in a mixture with further, preferably oil-soluble components as an additive in water-based drilling mud compositions, in particular for lubrication, the friction of the mud, e.g. with the drilling rod and/or the formation, being reduced measurably by addition of the agent. Suitable and preferred components in this context are hydrocarbons, fatty acid esters, fatty acids, fatty alcohols, surfactants, glycerol, triglycerides, glycols or any desired mixtures of these compounds.

According to the invention, linear or branched paraffins having 5 to 22 C atoms are employed in particular as hydrocarbons. Internal olefins (abbreviated to IO in the following) are furthermore suitable hydrocarbons. In this context, IOs are likewise compounds which are known per se and can be prepared by all the processes know for this to the person skilled in the art. EP 0 787 706 A1 describes e.g. a process for the synthesis of IOs by isomerization of alpha-olefins on sulphonic or persulphonic acids. It is characteristic that the IOs obtained in this way are linear and contain at least one olefinic double bond, which is not in the alpha-position of the alkyl chain. Those IOs or IO mixtures which contain IOs having 12 to 30 C atoms in the molecule, preferably having 14 to 24 C atoms and in particular having up to 20 C atoms in the molecule are preferably used according to the invention. The olefins used according to the invention preferably contain only one olefinic double bond.

Esters of the general formula R'—COO—R", in which R' represents a linear or branched, saturated or unsaturated alkyl radical having 15 to 25 C atoms and R" denotes a saturated, linear or branched alkyl radical having 6 to 22 C atoms, are furthermore a constituent of the compositions according to the invention. Such esters are also known chemical compounds. The main use thereof in drilling muds is e.g. the subject matter of EP 0 374 672 A1 and EP 0 374 671 A1. The use of those esters of which the radical R' represents a saturated or unsaturated alkyl radical having 15 to 25 C atoms and R" represents a saturated alkyl radical having 3 to 10 C atoms is particularly preferred. The saturated compounds are preferred in particular in this context. Particularly selected esters contain branched alcohols, here in particular 2-ethylhexyl radicals. A 2-ethylhexyl lauryl ester is particularly preferred as a mixture component together with the oligoglycerol esters.

Fatty alcohols are also suitable mixture components. Fatty alcohols follow the general formula R'"—OH, wherein R'" represents a saturated or unsaturated, branched or unbranched alkyl or alkenyl radical having 4 to 22 C atoms. Fatty alcohols having 16 to 22, in particular 16 to 18 C atoms are preferred. Linear and, independently thereof, saturated fatty alcohols are likewise preferred. Linear unsaturated fatty alcohols having 16 to 18 C atom are particularly preferred. Surfactants are likewise suitable admixing components for the oligoglycerol esters. In this context, in principle all types of surfactants, whether anionic, nonionic, zwitter-ionic or cationic surfactants, can be used. However, the nonionic and the anionic surfactants are preferred.

Typical examples of anionic surfactants are soaps, alkylbenzenesulphonates, alkanesulphonates, olefinsulphonates, alkyl ether sulphonates, glycerol ether sulphonates, methyl ester sulphonates, sulpho fatty acids, alkyl sulphates, fatty alcohol ether sulphates, glycerol ether sulphates, fatty acid ether sulphates, hydroxy-mixed ether sulphates, monoglyceride (ether) sulphates, fatty acid amide (ether) sulphates, mono- and dialkyl sulphosuccinates, mono- and dialkyl sulphosuccinamates, sulphotriglycerides, amide soaps, and ether carboxylic acids and salts thereof. The latter are particularly preferred surfactant components in the context of the present technical teaching.

Typical examples of nonionic surfactants are fatty alcohol polyglycol ethers, alkylphenol polyglycol ethers, fatty acid polyglycol esters, fatty acid amide polyglycol ethers, fatty amine polyglycol ethers, alkoxylated triglycerides, mixed ethers or mixed formals, optionally partially oxidized alk(en)yl oligoglycosides or glucuronic acid derivatives, fatty acid N-alkylglucamides, polyol fatty acid esters, sugar esters, sorbitan esters, polysorbates and amine oxides. If the nonionic surfactants contain polyglycol ether chains, these can have a conventional, but preferably a narrowed distribution of homologues.

The surfactants are an optional constituent in the additives. They are preferably employed in amounts of from 0.05 to 5 wt. %, in particular from 0.1 to 3 and preferably from 1 to 2.5 wt. %, in each case based on the total mud.

In addition to these components, other water-insoluble constituents can also be used together with the oligoglycerol esters, and in particular specifically:
(i) esters of C1-5-monocarboxylic acids and 1- and/or polyfunctional alcohols, wherein radicals of 1-hydric alcohols have at least 6, preferably at least 8 C atoms and the polyhydric alcohols preferably have 2 to 6 C atoms in the molecule,
(ii) esters or mixtures of esters chosen from the group of propyl carboxylate, butyl carboxylate, pentyl carboxylate, hexyl carboxylate, heptyl carboxylate, octyl carboxylate, nonyl carboxylate, decyl carboxylate, undecyl carboxylate, dodecyl carboxylate, tridecyl carboxylate, tetradecyl carboxylate, pentadecyl carboxylate, hexadecyl carboxylate, heptadecyl carboxylate, octadecyl carboxylate, nonadecyl carboxylate, eicosyl carboxylate, uneicosyl carboxylate, doeicosyl carboxylate and isomers thereof, wherein these esters in each case have a carboxylate radical having 1 to 5 C atoms,
(iii) water-insoluble ethers of monohydric alcohols having 6 to 24 C atoms
(iv) water-insoluble alcohols having 8 to 36 C atoms
(v) poly-alpha-olefins (PAO) and alpha-olefins
(vi) carbonates
(vii) mixtures of components (i) to (vi)

If the oligoglycerol esters are used as an additive together with other components, the oligoglycerol esters and the other components are preferably used together in weight ratios of from 20:1 to 1:1, preferably from 8:1 to 6:1 and in particular from 5:1 to 1:1.

In the context of the invention, the additives (where appropriate that is to say only the oligoglycerol ester or mixtures of various oligoglycerol esters) are preferably employed in amounts of from 10 to 0.1 wt. %, based on the total weight of the mud. Advantageous ranges are 5 to 1 wt. %, and in particular 3 to 1.5 wt. %.

In addition to the abovementioned constituents, the compositions according to the invention also optionally contain further additives, for example weighting agents, fluid-loss additives, viscosity-regulating additives, wetting agents, salts, biocides, corrosion inhibitors, and/or an alkali reserve.

The additives can be water-soluble, oil-soluble and/or water- or oil-dispersible. Conventional additives can be: fluid-loss additives, soluble and/or insoluble substances which build up structural viscosity, alkali reserves, agents for inhibiting undesirable exchange of water between drilled formations—e.g. water-swellable clays and/or salt beds—and the e.g. water-based fluid, wetting agents for better absorption of the emulsified oily phase on solid surfaces, e.g. to improve the lubricating action, but also to improve the oleophilic closure of exposed rock formations or rock faces, biocides, for example to inhibit bacterial attack on O/W emulsions, and the like. The following are accordingly cited only by way of example: Finely disperse additives to increase the density of the mud: Barium sulphate (barite) is widely used, but calcium carbonate (calcite) or the mixed carbonate of calcium and magnesium (dolomite) are also used.

Agents for building up the structural viscosity, which at the same time also act as fluid-loss additives: Bentonite or hydrophobized bentonite is primarily to be mentioned here. For salt-water muds, other comparable clays, in particular attapulgite and sepiolite, are of considerable importance in practice.

The co-use of organic polymer compounds of natural and/or synthetic origin can be of considerable importance in this connection. There are to be mentioned here in particular starch or chemically modified starches, cellulose derivatives, such as carboxymethylcellulose, guar gum, synthan gum or also purely synthetic water-soluble and/or water-dispersible polymer compounds, in particular of the type of high molecular weight polyacrylamide compounds with or without anionic or cationic modification. Thinners for regulating the viscosity: The so-called thinners can be organic or inorganic in nature, examples of organic thinners are tannins and/or quebracho extract. Further examples of these are lignite and lignite derivatives, in particular lignosulphonates.

The present invention also provides water-based drilling muds which contain amounts of from 1 to 10 wt. %, based on the total mud, of an additive containing or consisting of oligoglycerol esters according to the above description, and water, weighting agents, inorganic salts, thickening agents and pH regulators. They can moreover also contain further additives which are conventional in drilling muds. The present technical teaching also includes a method for improving the lubricating action of water-based drilling muds, preferably for lubricating drilling muds, wherein oligoglycerol esters are added to the muds as an additive in amounts of from 0.1 to 10 wt. %, based on the total mud.

Preferably, purely aqueous drilling muds are provided with the additive. WBM based on synthetic or natural sea-water are furthermore preferred. The water-based muds can preferably also contain silicates. The pH of the water-based muds is preferably in the range of from 8 to 13, and particularly preferably in the range of from 9 to 11.

The present invention also provides the use of the above oligoglycerol esters as lubricants, preferably in the water-based drilling mud compositions described above. In this use, it is preferable for the friction of the drilling mud composition, e.g. with the drilling rod and/or the formation, to be reduced measurably by addition of the agent, compared with the drilling mud composition without the oligoglycerol ester according to the invention. This is often accompanied by a reduction in the viscosity of the mud composition by addition of the oligoglycerol esters according to the invention.

EXAMPLES

Preparation of the Oligo Glycerol Esters 924 g (77 wt. %) of a technical-grade oleic acid (acid number 201.2) were mixed with 276 g (23 wt. %) of oligoglycerol (OH number: 1,178) (weight ratio 3.3:1) in a tank and the mixture was then heated to 240° C. under a nitrogen atmosphere. The water of reaction liberated was removed by distillation. When the acid number of the reaction mixture was less than 5, the pressure was reduced to 22 mbar. Thereafter, the mixture was allowed to cool to 90° C. 1 g (1 wt. %) of bleaching earth (Tonsil®) was then added and the mixture was then stirred for a further approx. 0.5 h. 1,080 g of a red-brown, clear liquid were obtained.

5 different glycerol esters with a different weight ratio between the fatty acid and the oligoglycerol were prepared in total:

| Use tests | | |
|---|---|---|
| Additive no. | Fatty acid | Molar ratio fatty acid:oligoglycerol |
| (1) | oleic acid | 4:1 |
| (2) | oleic acid | 3:1 |
| (3) | oleic acid | 2:1 |
| (4) | oleic acid | 1.5:1 |
| (5) | tall oil fatty acid | 4:1 |

Example 1

To test the lubricity, the following water-based drilling mud was prepared. Mixing was carried out in a Silverson mixer:

| | |
|---|---|
| Barium sulphate | 2,425.8 g |
| Water | 1,915.0 g |
| NaCl soln. (saturated) | 1,915.0 g |
| RevDust* | 679.5 g |
| Bentonite | 271.8 g |
| Surfactant | 68.0 g |
| Lignite | 40.8 g |
| NaOH | 27.2 g |
| Na$_2$CO$_3$ | 13.6 g |
| Cellulose derivative | 6.8 g |

*filter ash

The lubricity of the mud was then tested with a Falex® Pin & Vee Block Test Machine, F 1500 Standard, in accordance with ASTM D 2670 and ASTM D 3233. In this context, the mud was tested on the one hand without additive and then with 3 wt. % of an additive (1) to (5).

For comparison, the coefficient of friction was also measured for a mud with 3 wt. % of the commercially obtainable additive OMC 1037 (glycerol fatty acid monoester (tall oil fatty acid monoglyceride), manufacturer Cognis Oleochemicals GmbH), called additive (6).

The results of these measurements are to be found in FIG. 1. In the graph, the torque in [lb in] is plotted on the ordinate against increasing load (in [lbf]) on the abscissa. As is conventional in other publications in this technical field, the measurement results are stated in Anglo-Saxon units. In this context, the following factors for conversion into the SI system apply: 1 lbf=4.448 m kg s; 1 lb in=0.015 m kg It can be seen that the mud without the additive requires a higher torque with increasing load than the mud with the additive.

The comparison product (6) indeed produces good values, but it was possible to exceed these again by addition of the additives (1) to (5) according to the invention.

Example 2

Figure 2:
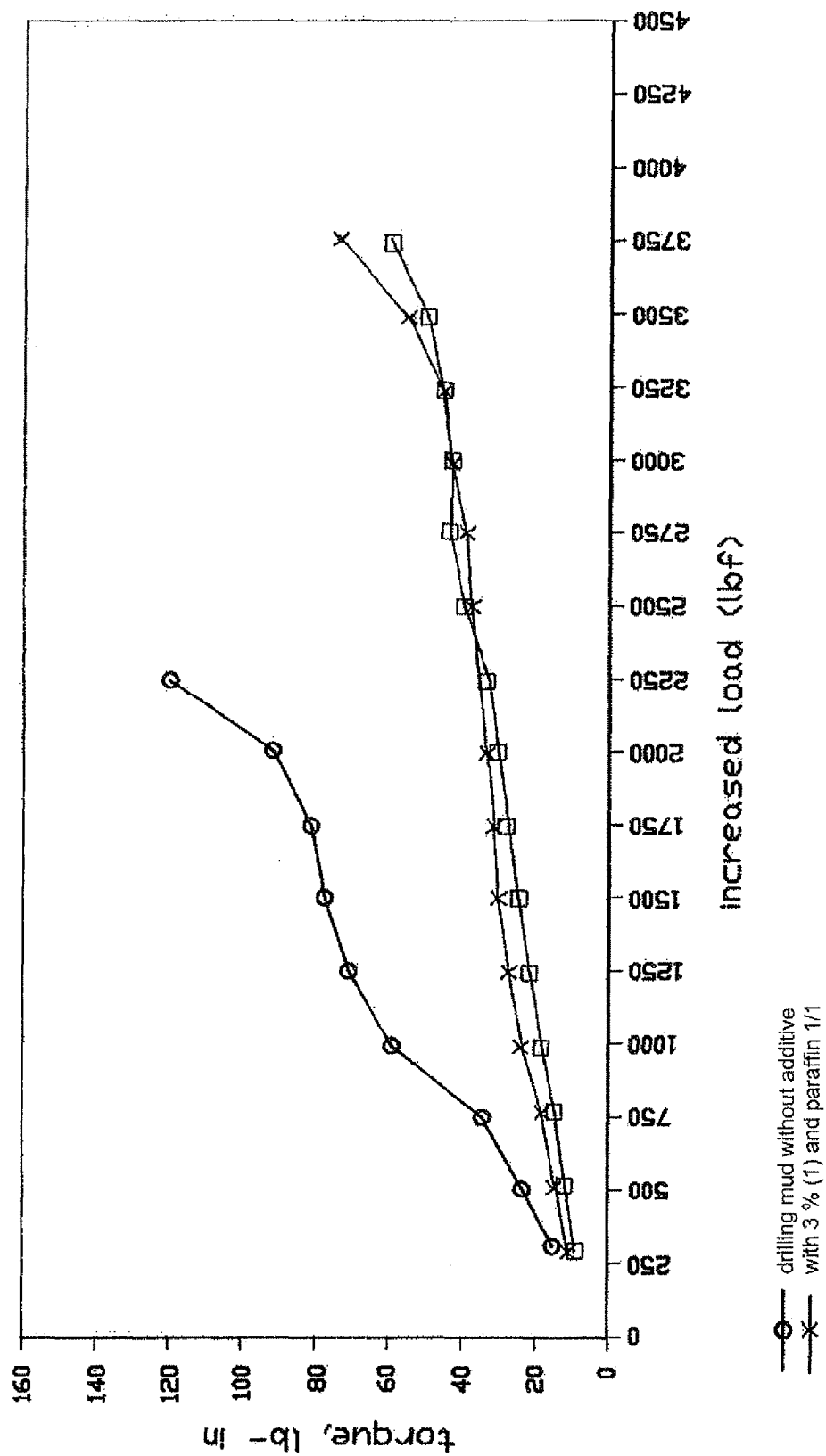
FIG. 2 is a graph showing a comparison of torque and increased load.

In a further experiment, those formulations which contained the oligoglycerol esters in a mixture with paraffin oil (weight ratio in each case 1:1) were tested. Concretely, the additives (1) and (5) were investigated and compared with a mud without the additive. The graph of FIG. 2 shows that the mud which contains the additives according to the invention achieves significantly better values than the mud without the additive.

Example 3

Figure 3:
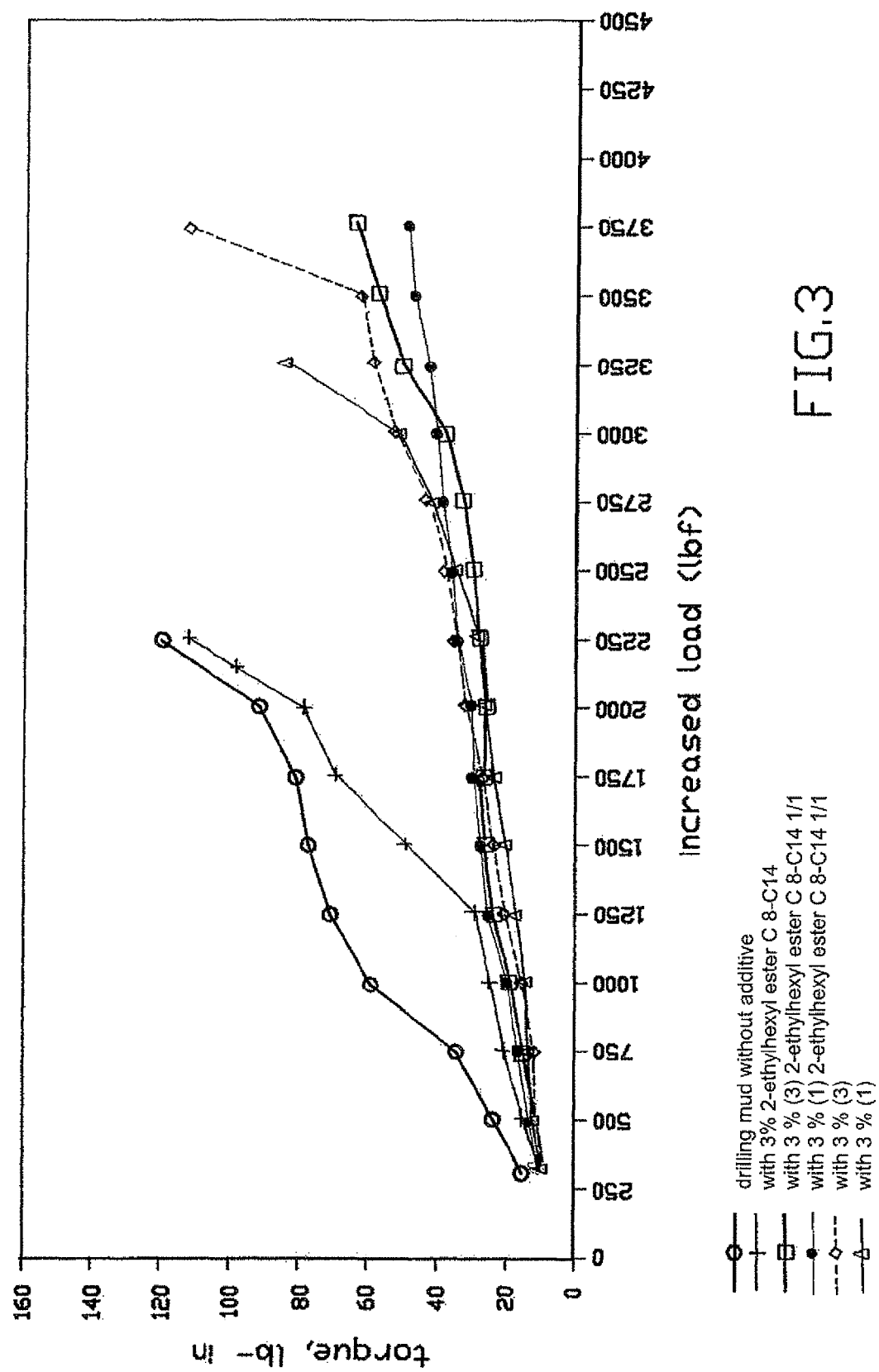
FIG. 3 is a graph showing a comparison of torque and increased load.

FIG. 3 shows tests in which the comparison mud without the additive was compared with those muds which contained the oligoglycerides either by themselves or as an additive mixture together with saturated 2-ethylhexyl esters of the fatty acid fraction C8-C14 in the weight ratio of 1:1.

It can be seen that the mud provided according to the invention with additives has a better lubricating action than the mud without the additive, and better values are also found if 3 wt. % of the ester by itself is added.

Example 4

Figure 4:
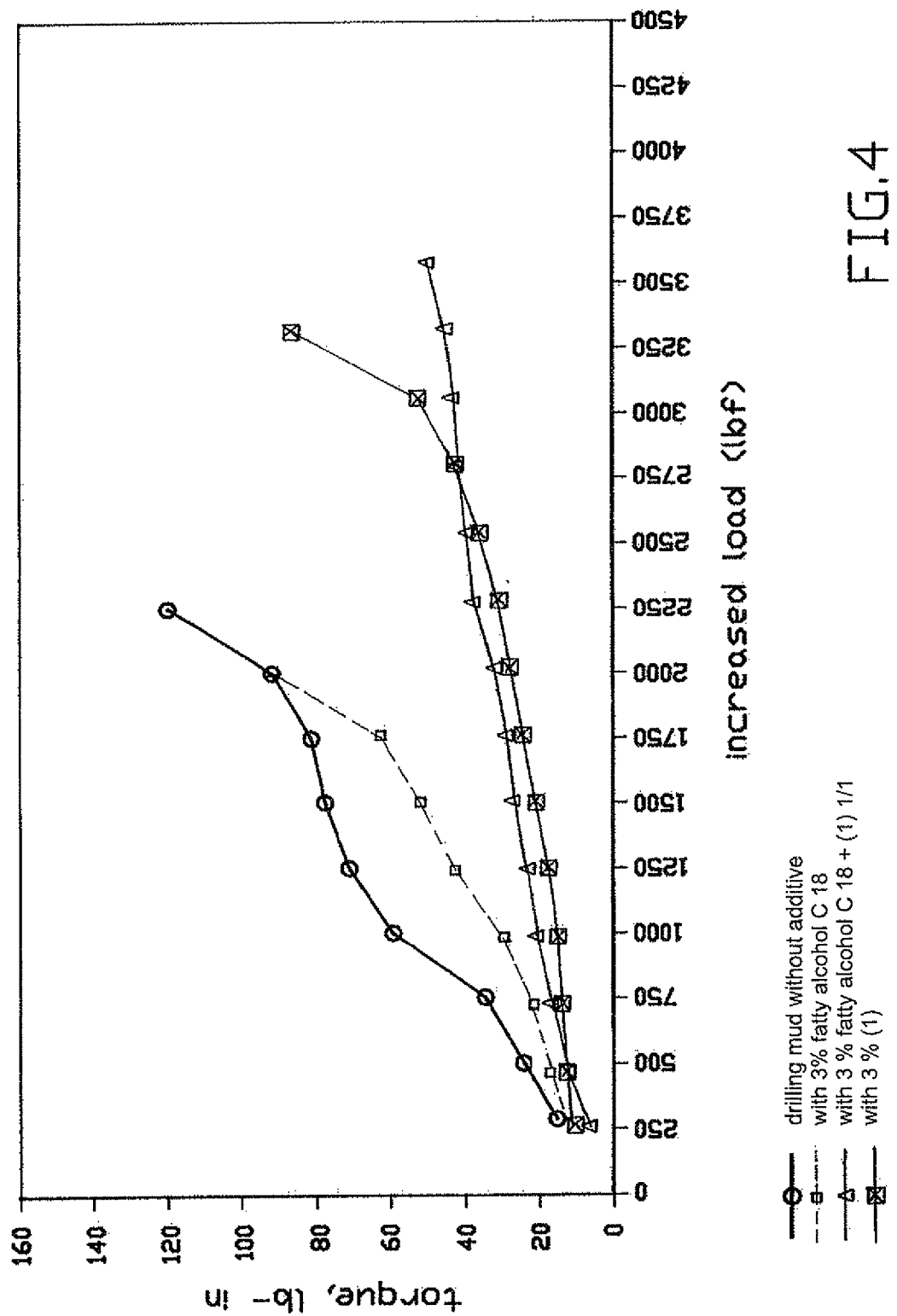
FIG. 4 is a graph showing a comparison of torque and increased load.

FIG. 4 shows the result of the lubricant test for a similar experiment to that in Example 3. However, a fatty alcohol having 18 C atoms was chosen here as a comparison. The mixture of fatty alcohol and oligoglyceride leads to a particularly good lubricating action.

Figure 5:
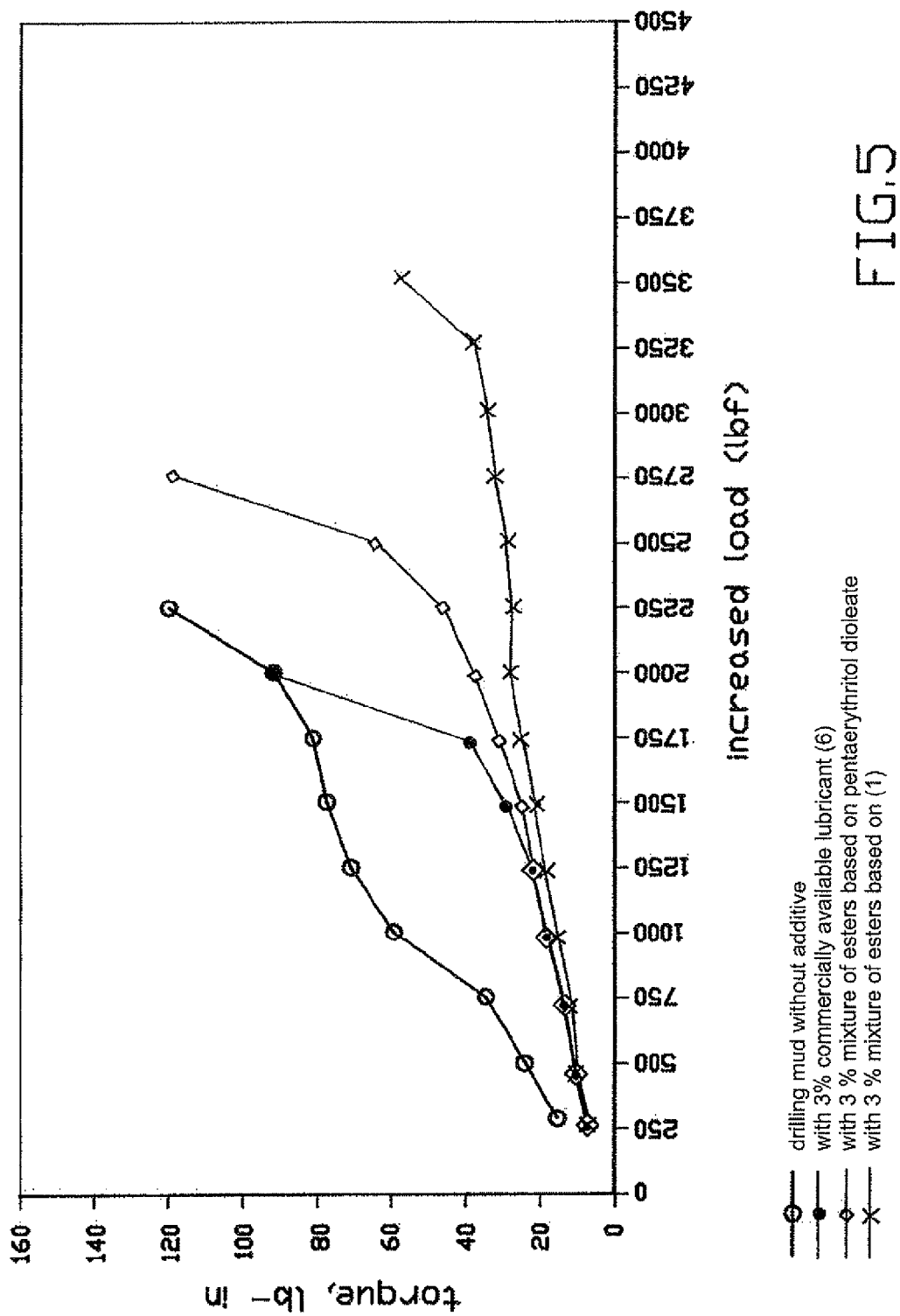
FIG. 5 is a graph showing a comparison of torque and increased load.

In FIG. 5, the coefficients of friction for three commercially available products have been compared with the mud without the additive and a mud with additive according to the invention (additive (3)). The superiority of the product according to the invention can be seen.

The invention claimed is:

1. An additive in water-based drilling mud compositions comprising oligoglycerol fatty acid esters, prepared from
   (a) an acid component selected from
      (a1) fatty acids of the general formula (I)

R—COOH            (I)

in which R represents a saturated or unsaturated, branched or linear alkyl or alkenyl radical having 7 to 21 C atoms, and/or
      (a2) dicarboxylic acids and/or
      (a3) dimer fatty acids and/or
      (a4) oligomer fatty acids and/or
      (a5) hydroxy fatty acids
   (b) a polyol component which is chosen from oligoglycerols or alkoxylates of oligoglycerols wherein the additive comprising oligoglycerol fatty acid esters is present in amounts of from about 1 to about 10 wt. %, based on the total weight of the mud.

2. The additive in water-based drilling mud compositions according to claim 1, characterized in that the fatty acids of the formula (I) are chosen from unsaturated linear fatty acids.

3. The additive in water-based drilling mud compositions according to claim 1 characterized in that oligoglycerol fatty acid esters which have been prepared by reaction of oligoglycerols of the general formula (II)

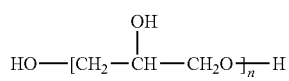
(II)

in which n denotes a number between 2 and 10, with fatty acid mixtures.

4. The additive in water-based drilling mud compositions according to claim 1 characterized in that the oligoglycerol fatty acid ester is a tri-, tetra- and/or pentaester of the oligoglycerol.

5. The additive in water-based drilling mud compositions according to claim 1 characterized in that the molar ratio of fatty acids:oligoglycerol in the esterification is in the range of from about 5:1 to about 1:1.

6. The additive in water-based drilling mud compositions according to claim 1 characterized in that the molar ratio of dimer fatty acids or oligomeric fatty acids to the oligoglycerol in the esterification is in the range of from about 1:1 to about 1:2.

7. The additive in water-based drilling mud compositions according to claim 1 characterized in that the oligoglycerol fatty acid esters are added to the water-based drilling mud compositions as lubricants for the drilling mud compositions which contain at least 70 wt. % of water—based on the phase which is liquid at room temperature.

8. The additive in water-based drilling mud compositions according to claim 1 characterized in that the oligoglycerol fatty acid esters are added as lubricants in emulsion drilling mud compositions, the external phase of which consists of water.

9. The additive in water-based drilling mud compositions according to claim 1 characterized in that the oligoglycerol esters are employed as additives for improving the lubricating action.

10. An additive in water-based drilling mud compositions comprising oligoglycerol fatty acid esters, prepared from
(a) an acid component selected from
(a1) fatty acids of the general formula (I)

R—COOH (I)

in which R represents a saturated or unsaturated, branched or linear alkyl or alkenyl radical having 7 to 21 C atoms, and/or
(a2) dicarboxylic acids and/or
(a3) dimer fatty acids and/or
(a4) oligomer fatty acids and/or
(a5) hydroxy fatty acids
(b) a polyol component which is chosen from oligoglycerols or alkoxylates of oligoglycerols
characterized in that oleic acid or tall oil fatty acids or mixtures thereof are chosen as the fatty acid for the esterification.

11. An additive in water-based drilling mud compositions comprising oligoglycerol fatty acid esters, prepared from
(a) an acid component selected from
(a1) fatty acids of the general formula (I)

R—COOH (I)

in which R represents a saturated or unsaturated, branched or linear alkyl or alkenyl radical having 7 to 21 C atoms, and/or
(a2) dicarboxylic acids and/or
(a3) dimer fatty acids and/or
(a4) oligomer fatty acids and/or
(a5) hydroxy fatty acids
(b) a polyol component which is chosen from oligoglycerols or alkoxylates of oligoglycerols
characterized in that the oligoglycerol esters are employed as an additive in a mixture with surfactants, hydrocarbons, fatty alcohols, fatty acid esters and/or fatty acids or glycerol, triglycerides or glycols.

12. A water-based drilling mud composition containing water, weighting agents, inorganic salts, thickening agents, pH regulators and from about 1 to about 10 wt. %—based on the weight of the total mud—of an additive comprising or consisting of oligoglycerol esters prepared from
(a) an acid component selected from
(a1) fatty acids of the general formula (I)

R—COOH (I)

in which R represents a saturated or unsaturated, branched or linear alkyl or alkenyl radical having 7 to 21 C atoms, and/or
(a2) dicarboxylic acids and/or
(a3) dimer fatty acids and/or
(a4) oligomer fatty acids and/or
(a5) hydroxy fatty acids
(b) a polyol component which is chosen from oligoglycerols or alkoxylates of oligoglycerols.

* * * * *